Dec. 13, 1927.
R. C. MARKS
1,652,539
QUEEN BEE SHIPPING AND INTRODUCING CAGE
Filed Jan. 25, 1926
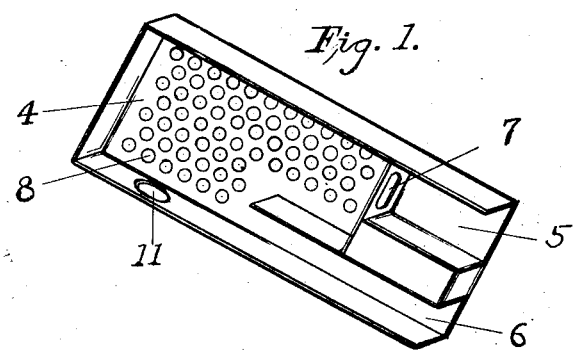
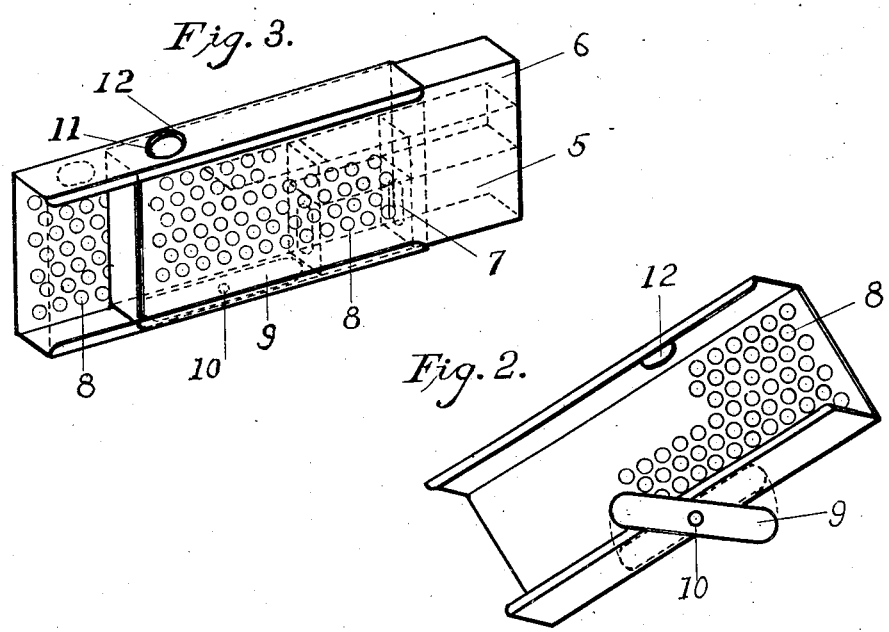
INVENTOR.
Roy Clifton Marks Patented Dec. 13, 1927.

1,652,539

UNITED STATES PATENT OFFICE.

ROY CLIFTON MARKS, OF MOORPARK, CALIFORNIA.

QUEEN-BEE SHIPPING AND INTRODUCING CAGE.

Application filed January 25, 1926. Serial No. 83,762.

This invention relates to queen bee introducing cages and apparatus used by queen bee breeders and apiarists and has for its principal object to provide a more positive means of introducing queen bees into the hive or colony.

The positive introduction of the queen bee into the hive or colony is accomplished with this cage through a novel construction of the passage ways; these passage ways are filled with queen cage candy which the bees have to remove before gaining access to the cage or allowing the queen bee her liberty into the hive. By making one of the passage ways shorter than the other, and interposing a queen excluder between the short passage way and the cage, the bees of the colony eat away the candy in the short passage way and are able to pass into the cage with the queen bee, but the queen bee can not as yet escape, she is still held prisoner until the bees of the colony have emptied the long passage way of candy. From the time the bees gain access to the cage through the short passage way and excluder, until they release the queen through the long passage way a continual procession of bees are entering and leaving the cage carrying the odor of the hive to the queen as well as feeding her, so by the time she is released she has acquired the same odor as the hive or colony and is accepted by the colony as one of their number.

A further object of the invention is to provide an introducing cage that can be more easily and effectively sterilized, thus preventing the spread of infectious diseases.

A still further object of the invention is to provide an introducing cage in which the passage ways may be more readily filled with queen cage candy, and a cage of more durable and neat construction.

With these, and other objects in view, as will more fully hereinafter appear, the invention consists in certain novel features of construction hereinafter fully described, illustrated in the accompanying drawings, and particularly pointed out in the appended claims; it being understood that various changes in the form of, proportions, size and minor details of the structure may be made without departing from the spirit or sacrificing any of the advantages of the invention.

In the accompanying drawings Figure 1 is a view of the introducing cage with the cover removed, showing the arrangement of the passage ways in accordance with the invention. Mention is made here however, and it is understood that the relative positions of the passage ways to each other or to the queen cage may be varied or changed without departing from the principle of the invention or affecting the satisfactory working of same.

Figure 2 shows the cover for the cage and the method devised to support the cage between the combs or frames of the hive.

Figure 3 shows the cage and cover assembled and placed in the relative position for the easy introduction of the queen bee.

Similar numerals of reference are employed to indicate corresponding parts throughout the several figures of the drawings.

The queen bee introducing cage here described comprises for its principal parts, a cage portion 4, Figure 1, two passage ways 5 and 6, preferably one twice as long as the other, and the shorter one 5, terminating or partially closed at the inner end with an excluder having a hole 7 that the worker bees can just pass through, but too small to allow the queen bee to pass through. The longer passage way 6 should be of such shape and size as to allow the queen bee as well as the worker bees to readily make their way in or out. The cage portion 4 which is intended to hold the queen bee is perforated as shown at 8 for the purpose of ventilation and to allow the bees in the hive to feed the queen bee through the perforations.

The cover for the cage, Figure 2, is preferably arranged to slide on and off the cage as shown and clearly set forth in Figure 3. It is not deemed necessary for the cover 2 to completely surround the cage 4, but the sides are turned under sufficiently to hold the cover in place. This also makes it necessary to slide the cover off the cage to remove it which works out in accordance with the invention. Perforations in the cover are also shown at 8, which is considered advisable as it will add to the ventilation of the cage.

A button 9, shown in Figure 2, is provided to support the cage between the combs or frames in the hive. The button 9, is also pivoted at 10, Figure 2, so that it may be turned parallel to the sides of the cage as shown by the dotted lines, and be out of the way for convenience in handling.

The holes 11 and 12, shown in Figures 1 and 2 respectively, provide an opening through which the queen bee may be safely placed into the cage. These holes are so spaced in the cover and in the cage that it is necessary to slide the cover partly off the cage until the holes coincide as shown in Figure 3, thus forming an opening. The holes 11 and 12 are likewise closed by sliding the cover back to normal position shown by dotted lines.

It will be further seen that by removing the cover 2 from the cage 1, the passage ways may readily be filled with queen cage candy, and likewise at any time should the candy become too hard for the bees to gnaw out, it may be easily removed.

It is further stated that it is preferable to make the introducing queen cage of metal or other material that will stand the action of boiling water or sterilizing chemicals, such as are used for that purpose, without being damaged or being made unfit for further use.

In consideration of the foregoing and other merits of this queen bee shipping and introducing cage;

I claim as follows,

1. A shipping and introducing cage for queen bees comprising a body portion and a cover therefor, the body portion provided with partition members defining two passageways of unequal length extending from the inside of the cage to the outside, and that part of the partition member defining the inside end of the shorter passageway having a queen excluding perforation therethrough.

2. A shipping and introducing cage for queen bees comprising a body portion provided with partition members defining two passageways of unequal length providing communication between the inside of the cage and the outside, the partition member defining the shorter passageway having a queen excluding perforation at its inner end which permits of the passage of worker bees.

3. A shipping and introducing cage for queen bees comprising a body portion having ventilating holes therethrough and a sliding cover for the cage having ventilating holes therethrough, the body portion having a hole in the side thereof and the cover having a hole in the side thereof and means whereby the cover may be slid on the body portion so that the holes will coincide to make an opening into the cage.

4. A shipping and introducing cage for queen bees comprising a body portion having ventilating holes therethrough, a cover for the cage having ventilating holes therethrough and a button for supporting the cage between the combs in the hive and means pivotally mounting the button whereby it may be turned parallel with the sides of the cage.

In testimony that I claim the foregoing as my own, I have hereto affixed my signature.

ROY CLIFTON MARKS.